(No Model.)
J. HARTMAN.
CONDUIT SYSTEM FOR ELECTRIC RAILWAYS.
No. 547,783. Patented Oct. 15, 1895.
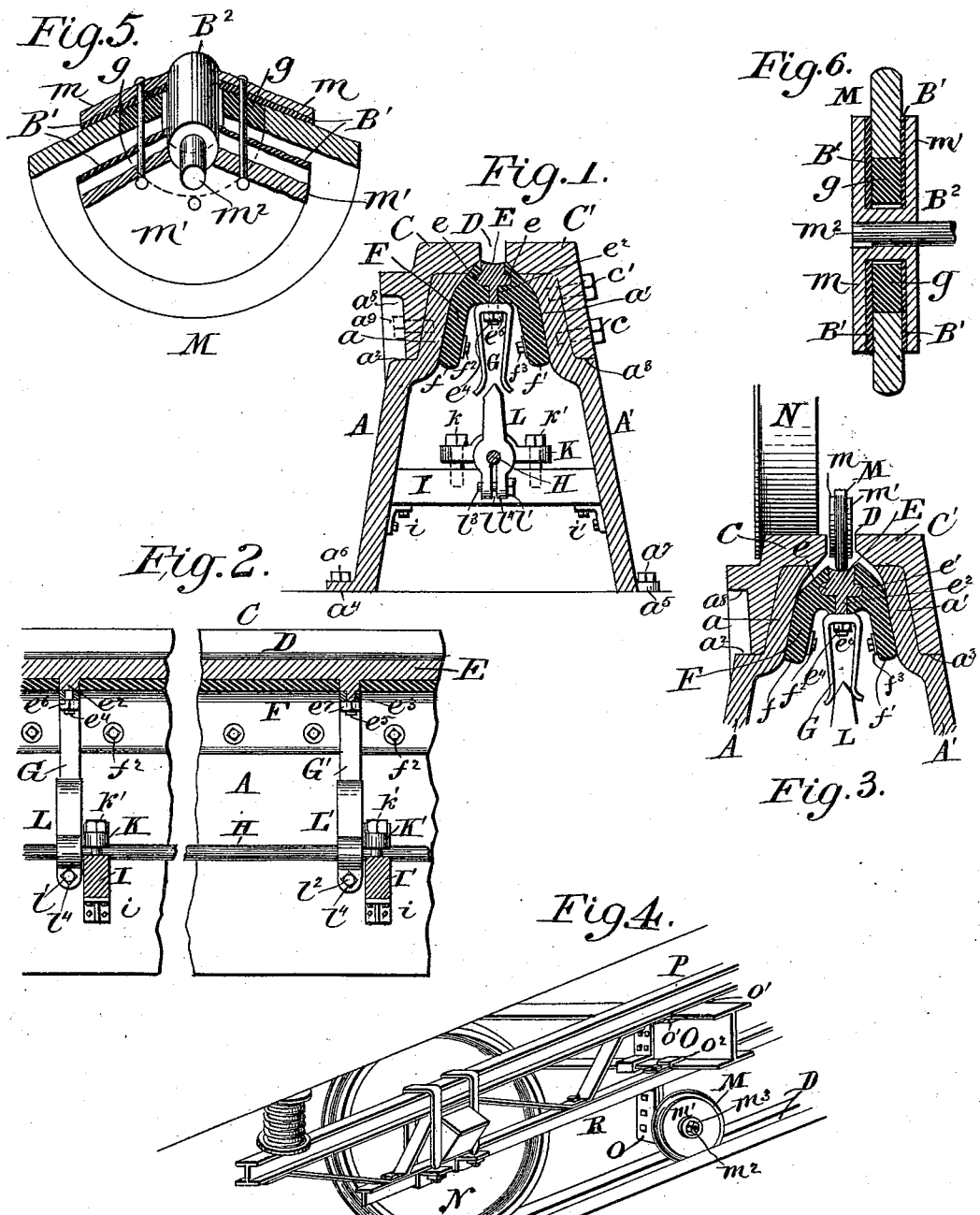
Witnesses:
Charles Margerum
Frank W. Wilson
Inventor:
Jno Hartman

UNITED STATES PATENT OFFICE.

JOHN HARTMAN, OF PHILADELPHIA, PENNSYLVANIA.

CONDUIT SYSTEM FOR ELECTRIC RAILWAYS.

SPECIFICATION forming part of Letters Patent No. 547,783, dated October 15, 1895.

Application filed April 7, 1893. Serial No. 469,482. (No model.)

*To all whom it may concern:*

Be it known that I, JOHN HARTMAN, a citizen of the United States, residing at Philadelphia, in the county of Philadelphia and State of Pennsylvania, have invented certain new and useful Improvements in Electrical Propulsion of Railway-Cars, of which the following is a specification.

My invention has relation to underground systems for the electrical propulsion of railway-cars, and has for its object the provision of certain new and useful improvements therein, the same consisting, first, of a conduit having therein an electric cable or supply-wire, and provided with a slot which is constantly in a closed condition, preventing the access of water, dirt, or other foreign matter to such conduit and the deleterious consequences thereof; second, of an electrical conductor in such slot which is alive or charged at the time or times only of the passage of the motor-car thereover, effecting an economy of power, and consequently a saving in the expense of maintaining the system, and obviating the danger incident to the presence of an unprotected constantly-charged conductor; third, in the particular means, hereinafter fully described and claimed and illustrated in the accompanying drawings, whereby the current of electricity is transmitted from the cable or supply-wire to the conductor aforesaid and thence to the motor.

In said drawings, Figure 1 is a vertical transverse section of a conduit embracing and having applied thereto my improvements; Fig. 2, a vertical longitudinal section, partly broken away, of the same; Fig. 3, a vertical transverse section illustrating the manner of transmitting the electric current from the cable or supply-wire to the conductor, and Fig. 4 a perspective view of so much of a car-truck as is necessary to show the medium through which such current is led to the motor. Fig. 5 is a perspective view of the trolley-wheel, partly broken away. Fig. 6 is a sectional view of said wheel.

A A' represent the sides or sections which form the improved conduit, the same each having offsets $a\ a'$ therein, forming shoulders $a^2\ a^3$, and terminating at their lower ends in feet or lugs $a^4\ a^5$, whereby, through the use of the bolts $a^6\ a^7$, such sections are secured to the usual ties, as at B, and the conduit sustained in position.

The offsets above mentioned form recesses for the track and guard rails C C', said rails at their lower edges resting on the shoulders $a^2\ a^3$, rail C being secured in place by lugs formed at intervals on the section A, as shown at $a^8$, and bolted to the offsets between said lugs, as shown in dotted lines at $a^9$, while rail C' is secured in its position through the use of the bolts $c\ c'$, which pass through this latter rail and into the offset $a'$, as shown. As will be observed, the flats of the rails C C', at their opposite edges, come quite close together, forming the slot D, the latter in practice being of such width as to prevent the access of the wheels of vehicles thereto, said slot having at the bottom thereof a slightly concaved conductor E, the same being of copper or other material of suitable conductivity and at such distance from the top of the slot as to prevent contact of shoe-calks therewith, said conductor being embedded in a rubber gasket F, and is prevented from disengagement therewith by its flanges $e\ e'$, and thus insulated from the rails C C', said gasket being of inverted-trough shape, having a gutter in its top of a shape corresponding to that of the conductor E, having its flanges $f\ f'$ secured by the bolts $f^2\ f^3$ to the inner sides of the offsets $a\ a'$, and the rubber composing it being partly vulcanized or hardened and having only sufficient resiliency to permit of its yielding slightly vertically to pressure.

The conductor E, at intervals, is provided with depending legs $e^2\ e^3$, which pass through corresponding openings in the diaphragm $f^4$ of the gasket F and terminate in bolts $e^4\ e^5$, the latter having secured thereon, by the nuts $e^6\ e^7$, the downwardly-projecting forks G G', of which legs and forks there may be any suitable number, disposed at the proper intervals for the attainment of the desired result.

H is the electric cable or supply wire, resting in recesses in wooden cross-bars, as shown at I I', and secured against dislodgment therefrom by the clamps K K', which partially encircle said cable and are secured to the cross-bars by bolts $k\ k'$, the brackets $i\ i'$, which are bolted to the inner sides of the sections A A' in the positions shown, affording supports for the cross-bars, which latter are in like manner secured thereto.

Secured to the cable H, in vertical alignment with and in such position as to be embraced by the forks G G', are conducting-tongues or contact-pieces L L', the latter having circular openings whereby they embrace the cable, and being split, as shown at $l$, the bolts $l'$ $l^2$ in the lugs $l^3$ $l^4$ afford means of clamping said tongues or contact-pieces to said cable.

Obviously the improved conduit, with its appurtenances, is applicable with equal facility to use at the side of the track and for the support of one of the rails, as shown and described herein, or between such rails, in which latter event two guard-rails, like that lettered C', may be used for forming the slot. The car-truck shown in Fig. 4 is adapted for use in connection with a conduit located in the position first above mentioned; but my invention is not limited to use in connection with this particular form of truck, as a car-truck of any other suitable character may be employed with any variation in the principles of my invention.

As shown in Figs. 3 and 4, the trolley-wheel M has secured on each of its sides metallic plates or guards $m$ $m'$, insulated from such wheel by the sheets B', which guards prevent the wheel from coming into contact with either of the rails and the passage of the electric current therethrough and to ground. This wheel, as shown, has an insulating-disk $g$, and one of its guard-plates is provided with a hub $B^2$ and is journaled on a shaft $m^2$, upon which it is secured by the nut $m^3$, outside the line of the car-wheel N, said shaft being secured at its inner end to the hanger $o$, the latter being bolted at its upper end to a slide-bar O, which is secured between the girder and T-rails P and R of the truck-frame, by and having liberty of lateral movement in the lugs $o'$ $o^2$, secured to said girder and T-rails. The purpose of using such sliding support for the trolley-wheel being to allow for variations in the radii of different curves. Of course where the conduit is midway between the rails the trolley-wheel need not be provided with a sliding support. Now as the car progresses the trolley-wheel M, whose lower edge is in a plane considerably lower than that of the tread of the car-wheel, exerts a pressure on the conductor E, which latter, owing to its support by the gasket F, yields to such pressure and causes one of the forks G G' to embrace one of the tongues LL', as shown clearly in Fig. 3, said forks, at their lower ends curving outwardly and the tongues being wedge-shaped to insure a good contact, closing the circuit and permitting the current to pass through the trolley-wheel and its support to the motor, which latter and the connections between it and the trolley-support not being necessary to show and may be of any suitable character. The conductor E and its fork and the gasket F resume their normal positions upon the clearance of this portion of said conductor by the trolley-wheel M, the circuit being thus again broken and the conductor rendered inactive thereby, the motor having in the meantime been sufficiently actuated to carry the car along until the wheel last mentioned reaches another circuit-making point of contact with the conductor, and so on. At the same time the fact that the gasket F forms a water-tight joint with the inner sides of the offsets $a$ $a'$, being of a corresponding curvature therewith, affords a hermetically-sealed chamber to which no foreign matter of any character has access, preventing the impairment of any of the parts of the improved underground system and insuring an invariably perfect operation at all times, while the conductor E is only active at the time of the passage thereover of the trolley, at which time the active portion is covered by the car and offers such resistance to all other degrees of pressure less than that of the trolley as to prevent the closing of the circuit and the charging of such conductor by any other means, so that perfect freedom from danger is assured.

What I claim as my invention is as follows:

1. The combination with an underground conduit provided with a longitudinal slot, of the insulator secured to the inner walls of the conduit sections adjacent to the slot, and a conductor embedded in the insulator and normally closing the slot, and having a portion depending through the insulator, as set forth.

2. The combination with an underground conduit having a longitudinal slot, of the vertically yieldable gasket or insulator having a perforated diaphragm, and secured to the inner side walls of the conduit adjacent to the slot, and the conductor having flanges embedded in the insulator, as set forth.

3. The combination with an underground conduit provided with a longitudinal slot, of the vertically yielding insulator having a perforated diaphragm, and secured to the inner side walls of the conduit adjacent to the slot, the conductor having flanges embedded in the insulator, and the legs with which the conductor is provided depending through the perforation, as set forth.

4. The combination with an underground conduit having a longitudinal slot, of the vertically yieldable insulator secured to the inner side walls of the conduit, and the conductor embedded in the insulator and having an exposed trolley wheel tread below the top surface of the insulator, as set forth.

5. The combination with an underground conduit having a longitudinal slot, of the vertically yieldable insulator having depending flanges secured to the inner side walls of the conduit, and a diaphragm between the flanges, in the same vertical plane with the slot, as set forth.

6. The combination with an underground conduit having a longitudinal slot of the vertically yieldable insulator having a perforated diaphragm and secured to the inner walls of the conduit adjacent to the slot, the conductor carried in the insulator and having legs depending through said perforations, and the forks secured to and depending from the said legs, as set forth.

7. The combination of an underground conduit provided with a longitudinal slot, an electric cable or supply wire in the conduit, a vertically yieldable insulator provided with flanges secured to the inside walls of the conduit, and a conductor embedded in the insulator to close the said slot without entering it, as set forth.

8. The combination of an underground conduit provided with a longitudinal slot, an electric cable or supply wire in the conduit, a vertically yieldable insulator having flanges rigid with the inside walls of the conduit, the conductor embedded in the insulator to close the said slot without entering it, and a trolley wheel or current collector for contact with the conductor, as set forth.

9. The combination with an underground conduit having a longitudinal slot, of the vertically yieldable insulator having a perforated diaphragm and secured to the inner walls of the conduit adjacent to the slot, the conductor carried in the insulator and having legs depending through said perforations, the forks secured to and depending from the said legs, and the conducting tongues from the said cable to the forks, as set forth.

10. The combination with an underground conduit having a longitudinal slot, of the vertically yieldable insulator having a perforated diaphragm secured to the inner walls of the conduit adjacent to the slot, the conductor carried in the insulator and having legs depending through said perforations, the forks secured to and depending from the said legs, the clamps partially encircling the said cable and supported by the walls of the conduit, and the split conducting tongues from the said cable to the said forks, as set forth.

11. The combination with an underground conduit having a longitudinal slot, of a conductor, and an inverted trough shaped insulator secured upon the inside of the conduit and having a gutter in its top of a shape corresponding to that of the conductor, as set forth.

12. The combination with an underground conduit having a longitudinal slot, of the conductor having a concaved trolley wheel tread, and an inverted trough shaped insulator secured upon the inside of the conduit and having a gutter in its top of a shape corresponding to that of the conductor, in which the latter is embedded, as set forth.

13. In a trolley wheel for underground electric conduits, the guard plates, one of which has a hub adapted to accommodate a suitable spindle or shaft, the insulating disk, and the insulating sheets, as set forth.

In testimony whereof I have hereunto set my hand this 4th day of April, A. D. 1893.

JOHN HARTMAN.

Witnesses:
R. DALE SPARHAWK,
WM. H. POWELL.